April 28, 1942. T. P. SIMPSON ET AL 2,281,527
METHOD OF CONDUCTING CATALYTIC CONVERSION OPERATIONS
Filed Sept. 17, 1938
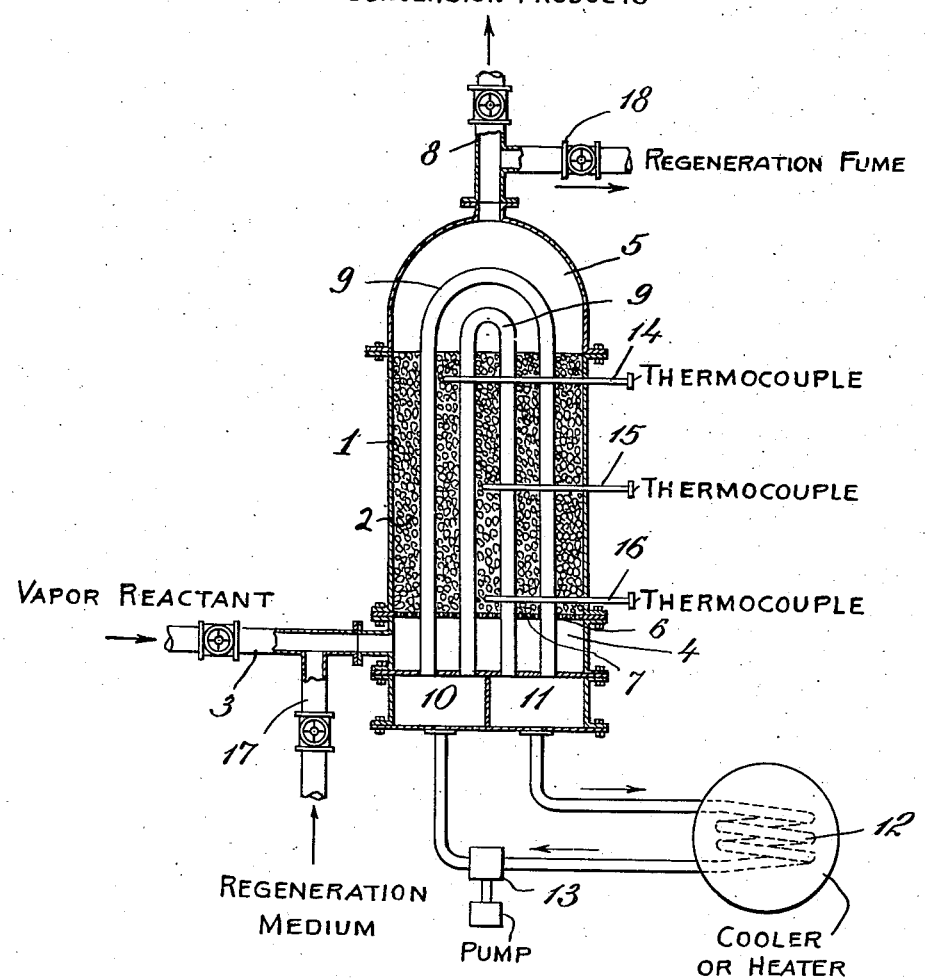
THOMAS P. SIMPSON
JOHN W. PAYNE
JOHN A. CROWLEY JR.
INVENTORS Patented Apr. 28, 1942

2,281,527

UNITED STATES PATENT OFFICE 2,281,527

METHOD OF CONDUCTING CATALYTIC CONVERSION OPERATIONS

Thomas P. Simpson, John W. Payne, and John A. Crowley, Jr., Woodbury, N. J., assignors to Socony-Vacuum Oil Company, Incorporated, New York, N. Y., a corporation of New York Application September 17, 1938, Serial No. 230,356

5 Claims. (Cl. 196—52)

This invention is directed to methods for the conduct of unitary operations for the conversion of materials in a contact mass followed by regeneration in situ of the contact mass. It has specifically to do with operations such as the conversion of hydrocarbons, as for instance of high boiling petroleum fractions to low boiling hydrocarbons, and the like, in which a carbonaceous deposit is formed upon the contact mass, which deposit is removed by burning.

In such processes, where regeneration of the mass is conducted in situ, the reaction step and regeneration step form related portions of a unitary process comprising both, the overall efficiency of which may be altered by changes which to casual inspection appear to affect only one portion of the cycle.

A very pertinent consideration in such processes is the length of time required for regeneration in relation to the time spent on reaction. Any material reduction in time required for regenerating which is not accompanied by substantial loss of reaction efficiency may raise the yield of converted product per unit of cycle time and so bring about increased total efficiency of the process.

It is a major object of this invention to provide a method for the operation of such processes whereby the time of regeneration is materially shortened relative to time of reaction, without substantial loss of conversion efficiency during reaction, whereby increased overall efficiency of process may be obtained. Other objects are in part obvious, and in part appear hereinafter.

This invention is applicable, as pointed out above, to a wide variety of processes embracing in common the features of conversion in a contact mass, deposit of an oxidizable conversion product in said contact mass to poison or decrease the activity of the mass, and regeneration of the mass by oxidation reactions. Therefore, it is to be understood that while the following discussion uses catalytic vapor phase cracking of gas oil to gasoline as an illustrative example, the invention is not limited thereto or thereby.

It is well known that gas oil may be cracked to gasoline by conducting the gas oil in vapor phase, at temperatures of the order of 850° F., to and through a contact mass of the nature of granules or pellets of clay, which may or may not carry additional catalytic material. For purposes of illustration, an apparatus for conducting such a reaction is shown in diagrammatic form in the single figure of the drawing attached hereto.

In the drawing, 1 is a catalyst case containing a contact mass 2, so arranged that the reactant feed, heated to reaction temperature entering through pipe 3 is constrained to pass longitudinally through case 1 from chamber 4 to chamber 5, and so pass longitudinally through the contact mass 2. Support of the contact mass and uniform introduction of reactant thereto are accomplished by plate 6, which contains orifices 7. Conversion products are withdrawn by pipe 8. Since many reactions of this type are endothermic and since the oxidation reaction used for regeneration is highly exothermic, it is usual to provide some means for control of the temperature of the contact mass, such as that shown here by tubes 9, through which a fluid heat exchange medium circulates from chamber 10 to chamber 11, which heat exchange medium, external to the catalyst case, passes through heat exchanger 12, wherein necessary temperature adjustments may be made, and is circulated by pump 13. It is also customary to provide means for observing the temperature of the contact mass at several points as indicated by thermocouples 14, 15, 16. Where regeneration becomes necessary, flow of reactant through pipe 3 and of conversion products through pipe 8 is cut off, an oxidizing gas is introduced through pipe 17, and the regeneration fume, resulting from oxidation of the carbonaceous or other impurity deposited on the contact mass, is disposed of by pipe 18. During regeneration the heat transfer medium is circulated to hold the contact mass temperature below that level which would result in loss of efficiency of the contact mass by sintering or otherwise. A convenient fluid heat exchange medium is a fused inorganic salt, although water is frequently used. Some types of process may accomplish regeneration without requiring control by a heat transfer medium. This invention is likewise applicable to such processes.

In such a process, charging a stock produced by the vaporization of 90% of Mirando crude oil, at a temperature of 850° F. under a pressure of 30 pounds per square inch gauge, using a pellet catalyst consisting essentially of hydrated aluminum silicate, charging at a rate of 1.25 unit volumes of oil (cold liquid basis) to 1 unit volume of contact mass, per hour, about 49.3% of the charge is converted to gasoline, and about 4.0% to relatively non-condensible gases, and if the cracking operation is continued for 10 minutes, coke is deposited upon the contact mass to the extent of about 0.7% by weight of the contact mass. Regenerating in the usual manner, using an air rate of ½ cubic foot per minute per cubic foot of contact mass and continuing until the regeneration fume showed 2% carbon dioxide required 15 minutes. This may be considered as a basic operation.

It is well known to those in the art that in the course of such a regeneration, the temperature at any point in the catalyst reaches and passes through a maximum while copious amounts of carbon dioxide are still being evolved, and that the temperature of the catalyst is well down the descending portion of the curve before the amount of carbon dioxide in the effluent gases reaches a value indicative of substantially complete removal of contaminant from catalyst.

While not all of the possible variables have been mentioned specifically in the above description of the "basic operation" a short consideration of the character of this operation will show that they have been considered and are present. First, since catalysts of the type described are widely known to be susceptible to damage at temperatures of the order of 1000–1100° F., it is a commonly known fact that no method of regeneration may be practiced which permits those temperatures to be exceeded. Secondly, in any apparatus of the kind shown, once it is set up for operation, the relationship of catalyst volume, heat transfer surface and the nature and rate of circulation of heat transfer medium used inexorably fix the maximum amount of heat which may be removed per unit of time. These two things, viz., maximum temperature and maximum rate of heat removal, being fixed, the nature of the regenerating medium and its rate of application are also fixed at the upper limit. Obviously a regenerating medium so rich in oxygen that the rate of heat generation is above the fixed capacity for heat removal cannot be used. Nor, obviously, can one apply the ordinary medium, air, at so fast a rate that heat is generated more rapidly than it can be removed. In either case all that would result is damage to the catalyst. Economic limitations similarly set an inexorable limit upon the minimum. Since time spent on regeneration is unproductive time, no operation would ever be contemplated in which, because of low oxygen content of regeneration medium, or low rate of application of that medium, the rate of regenerative burning would be less than the most rapid which could be handled adequately by the heat removal facilities available. Thus, it is not possible to define the "basic operation" other than to say that it is that sequence of cracking, purging, regeneration to a minimum content of carbon on catalyst, and final purging, in which the rate of regeneration burning, as determined by oxygen content of regeneration medium, or by rate of regeneration medium flow, or both, is as great as can be obtained without generating heat at a rate greater than it can be removed to prevent damage to the catalyst. Those skilled in the art will appreciate that this definitely describes an operation which may be definitely fixed for any one apparatus, but which may vary somewhat in nature from one apparatus to another.

This invention is based upon the discovery that if regeneration in such a process be stopped when the contact mass has reached its maximum temperature, that substantial reductions in regeneration and cycle time may be made, and that while apparent reductions in reaction yield subsequent to regeneration occur, that the net result is an actual increase in yield of converted product per unit of catalyst volume per unit of time. This finding is contrary to what would be expected, since it is known that such regenerations are incomplete.

For a first example, if in an operation such as described above, the flow of regenerating medium is stopped when the last portion of contact mass to heat had reached its peak temperature, all conditions otherwise being the same, and the contact mass was steamed to cool it to the reaction temperature of 850° F., a series of such runs would show a converted product yield of about 42.2% of charge, and a gas make of about 3.0% of charge, but after 10 minutes of such reaction, the regeneration could be accomplished in 7 minutes instead of 15, as before.

Similarly, for a second example, in the same operation, if the regeneration be stopped similarly, but if instead of steaming to cool contact mass to 850° F. (the reaction temperature), it is only steamed a short time and returned to reaction at a temperature of 930–940° F., a series of such runs would show a converted product yield of about 43.1%, and a gas make of about 8.2%, but after 10 minutes of such reaction the regeneration could be accomplished in 8 minutes instead of 15, as before.

It will of course be understood that in both the basic operation and the exemplary operations above described, a period of time is devoted to purging the catalyst of reactants before regeneration, and to purging it of regeneration medium after regeneration. These operations are identical in both the basic operation and the exemplary operation, and so are not considered herein. In as much as these purging operations are usually practised in catalytic processes of the nature herein described, and do not of themselves effect a change in the nature of the improvement herein claimed, it is to be understood that the unitary processes comprising reaction and regeneration, herein claimed, if desired, may include such purgings.

The true economic significance of these changes is shown below in Table I, where the specific "basic operation" described above, and the operation of Examples I and II are compared. As shown in the previous discussion, a "basic operation" can be numerically defined only in connection with a particular operating set up. Consequently, comparison may be made only with other operations conducted in the same operating set up so as to be subject to the same limitation of maximum rate of heat removal. The three operations noted as "basic operation," "Example I," and "Example II" were conducted in the same apparatus, at the same highest possible rate of regeneration commensurate with the heat removal facilities available, and are strictly comparable as showing the result of changing a single variable, namely, the time-temperature experience of the catalyst during regeneration.

Table I

| | Per cycle | | | | | Gasoline cu. ft. per cu. ft. catalyst per hr. |
|---|---|---|---|---|---|---|
| | Total charge cu. ft. oil per cu. ft. catalyst | Total yield cu. ft. gasoline per cu. ft. catalyst | Time on reaction, minutes | Time on regeneration, minutes | Total time, minutes | |
| "Basic operation" | .208 | .1025 | 10 | 15 | 25 | .246 |
| Example I | .208 | .0878 | 10 | 7 | 17 | .310 |
| Example II | .208 | .0896 | 10 | 8 | 18 | .299 |

From the above, it clearly appears that by the method of operation set forth herein, while the percentage utilization of charge is unquestionably decreased, the yield of converted product per cubic foot of contact mass per unit of overall time is increased about 25%. Since, for any commercial operation, the available volume of catalyst is a fixed value, it is obvious that the method herein disclosed is a means for increasing the product yield of the operation.

We claim:

1. In a unitary operation for the conversion of hydrocarbons in the presence of a contact mass followed by regeneration in situ of the contact mass, the method which comprises passing hydrocarbons at reaction temperature through the contact mass for a predetermined period of reaction, then passing regeneration medium through said contact mass until the time when the last portion of said mass to be regenerated has reached maximum regeneration temperature and stopping such passage substantially at said time, and thereafter resuming passage of hydrocarbons through said mass.

2. In a unitary operation for the conversion of hydrocarbons in the presence of a contact mass followed by regeneration in situ of the contact mass, the method which comprises passing hydrocarbons at reaction temperature through the contact mass for a predetermined period of reaction, then passing an oxidizing gas through said contact mass at such rate as to obtain the maximum speed of regeneration without overheating said mass until the time when the last portion of said mass to be regenerated has reached maximum regeneration temperature and stopping such passage substantially at said time, and thereafter resuming passage of hydrocarbons through said mass.

3. In a unitary operation for the conversion of high boiling hydrocarbons to hydrocarbons of the nature of gasoline by passing high boiling hydrocarbons at temperatures of the order of 800° F. and above through a contact mass capable of promoting cracking, followed by regeneration in situ of the contact mass, the method which comprises passing hydrocarbons at reaction temperature through the contact mass for a predetermined period of reaction, then passing an oxidizing gas through said contact mass at such rate as to obtain the maximum speed of regeneration without heating said mass above about 1100° F. until the time when the last portion of said mass to be regenerated has reached maximum regeneration temperature and stopping such passage substantially at said time, and thereafter resuming passage of hydrocarbons through said mass.

4. In a unitary operation for the conversion of high boiling hydrocarbons to hydrocarbons of the nature of gasoline by passing high boiling hydrocarbons at temperatures of the order of 800° F. and above through a contact mass capable of promoting cracking, followed by regeneration in situ of the contact mass, the method which comprises passing hydrocarbons at reaction temperature through the contact mass for a predetermined period of reaction, then passing an oxidizing gas through said contact mass at such rate as to obtain the maximum speed of regeneration without heating said mass above about 1100° F. maximum, simultaneously acting to prevent undue rise of the temperature of said mass above said maximum by circulating a fluid heat exchange medium at a temperature substantially below said maximum in indirect heat exchange relationship with said mass until the time when the last portion of said mass to be regenerated has reached maximum regeneration temperature and stopping such passage substantially at said time, and thereafter resuming passage of hydrocarbons through said mass.

5. In a unitary catalytic process, wherein hydrocarbons are converted in a conversion step in the presence of solid catalyst particles which become spent from deposited carbonaceous matter during the conversion and wherein said spent particles are regenerated in the form of a bed of catalyst in a regeneration step by burning off said deposited carbonaceous matter by contacting the spent particles with air under combustion conditions and wherein the regeneration step is characterized by controlling the temperature of the catalyst particles within a regeneration temperature range between the minimum combustion temperature and the maximum combustion temperature that does not cause substantial heat damage to the particles while permitting the temperature of the particles during the regeneration to rise from a minimum temperature within said range to a maximum temperature peak within said range, the improvement which comprises only partially regenerating the spent catalyst by bringing each spent catalyst particle up to said maximum temperature peak and stopping the regeneration of all particles so that a substantial portion of the particles is regenerated only to the extent effected by stopping the regeneration of the particles of such portion of particles at substantially said maximum temperature peak whereby they retain substantially more carbonaceous matter than the usual amount retained on such catalyst regenerated by the usual process, and re-using said partially regenerated catalyst in said conversion step for the conversion of further quantities of hydrocarbons.

THOMAS P. SIMPSON.
JOHN W. PAYNE.
JOHN A. CROWLEY, Jr.